United States Patent
Goto et al.

(10) Patent No.: US 7,239,796 B2
(45) Date of Patent: Jul. 3, 2007

(54) INFORMATION RECORDING AND REPRODUCING APPARATUS

(75) Inventors: Nobuyuki Goto, Chigasaki (JP); Noriaki Fukutsu, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 1463 days.

(21) Appl. No.: 09/950,617

(22) Filed: Sep. 13, 2001

(65) Prior Publication Data

US 2002/0037154 A1    Mar. 28, 2002

(30) Foreign Application Priority Data

Sep. 27, 2000  (JP)  ............................ 2000-293740
Sep. 27, 2000  (JP)  ............................ 2000-294231

(51) Int. Cl.
*H04N 5/91* (2006.01)
(52) U.S. Cl. ............................. 386/83; 386/46; 386/125
(58) Field of Classification Search ............... 386/1, 386/45, 46, 83, 105, 106, 125, 126; 348/231.1, 348/231.2; 368/10; 725/14
See application file for complete search history.

(56) References Cited

U.S. PATENT DOCUMENTS

| | | | |
|---|---|---|---|
| 5,056,070 A * | 10/1991 | Shibuya et al. | ............... 368/10 |
| 5,734,444 A * | 3/1998 | Yoshinobu | .................. 725/14 |
| 5,822,493 A * | 10/1998 | Uehara et al. | ................ 386/46 |
| 6,137,943 A | 10/2000 | Kanda | |
| 6,501,727 B1 | 12/2002 | Nozaki et al. | |
| 6,678,463 B1 * | 1/2004 | Pierre et al. | ................... 386/83 |
| 6,970,637 B1 * | 11/2005 | Yoshida | ...................... 386/46 |

2002/0054752 A1   5/2002  Wood et al.

FOREIGN PATENT DOCUMENTS

| | | |
|---|---|---|
| EP | 0 973 333 A2 | 1/2000 |
| EP | 1 014 715 | 2/2000 |
| EP | 1 107 256 A2 | 6/2001 |
| EP | 1 107 588 | 6/2001 |

(Continued)

OTHER PUBLICATIONS

Japanese Book—ASCII DOS/V ISSUE, ASCII Corporation, Sep. 1, 1999, vol. 5 No. 9, pp. 271-276, "Enjoy Television with Giga Pocket, New Television Life Started with VAIO".

(Continued)

*Primary Examiner*—James J. Groody
*Assistant Examiner*—Christopher Onuaku
(74) *Attorney, Agent, or Firm*—Louis Woo

(57) ABSTRACT

In an information recording and reproducing apparatus, information representative of first video contents is recorded on a recording medium. A decision is made as to whether or not a remaining usable capacity in the recording medium corresponds to longer than a predetermined time during the recording of the first video-contents information on the recording medium. When it is decided that the remaining usable capacity in the recording medium does not correspond to longer than the predetermined time, recorded information representative of second video contents is erased from the recording medium to increase the remaining usable capacity in the recording medium. Continuing the recording of the first video-contents information on the recording medium is enabled due to the erasing of the second video-contents information from the recording medium.

2 Claims, 8 Drawing Sheets

FOREIGN PATENT DOCUMENTS

| | | |
|---|---|---|
| JP | 8-180504 | 7/1996 |
| JP | 10-092107 | 4/1998 |
| JP | 10-241228 | 9/1998 |
| JP | 11-177919 | 7/1999 |
| JP | 11-213627 | 8/1999 |
| JP | 2000-113649 | 4/2000 |
| JP | 2000-228081 | 8/2000 |
| WO | 00/08850 | 2/2000 |
| WO | 02/03682 A2 | 1/2002 |

OTHER PUBLICATIONS

Japanese Book—"Method of Thoroughly Utilizing AV, Television Recording", Nikkei Personal Computer, NIKKEI BP Corporation, Mar. 6, 2000, No. 356, pp. 222-229.

* cited by examiner

INFORMATION RECORDING AND REPRODUCING APPARATUS

BACKGROUND OF THE INVENTION

1. Field of the Invention

This invention relates to an apparatus for recording and reproducing information on and from a recording medium such as a hard disk or a semiconductor memory.

2. Description of the Related Art

A VTR (video tape recorder) records and reproduces information representative of video contents on and from a magnetic tape. It is known to record and reproduce video-contents information on and from a hard disk or a semiconductor memory.

There is a dual apparatus which can record and reproduce video-contents information on and from a magnetic tape and a hard disk. The dual apparatus can be used to implement the following process. A sequence of broadcasted television programs is continuously recorded on the hard disk, while desired ones selected from the programs recorded on the hard disk are dubbed onto the magnetic tape. In the dual apparatus, when the hard disk is fully occupied by recorded programs, a new program can not be recorded thereon.

SUMMARY OF THE INVENTION

It is an object of this invention to provide an information recording and reproducing apparatus which can record new information even when a recording medium is fully occupied by old information.

first aspect of this invention provides an information recording and reproducing apparatus comprising first means for recording information representative of first video contents on a recording medium; second means for deciding whether or not a remaining usable capacity in the recording medium corresponds to longer than a predetermined time during the recording of the first video-contents information on the recording medium by the first means; third means for, when the second means decides that the remaining usable capacity in the recording medium does not correspond to longer than the predetermined time, erasing recorded information representative of second video contents from the recording medium to increase the remaining usable capacity in the recording medium; and fourth means for enabling the first means to continue the recording of the first video-contents information on the recording medium due to the erasing of the second video-contents information from the recording medium by the third means.

A second aspect of this invention is based on the first aspect thereof, and provides an information recording and reproducing apparatus wherein the second video-contents information comprises information which has already been played back.

A third aspect of this invention is based on the first aspect thereof, and provides an information recording and reproducing apparatus wherein the second video-contents information comprises oldest recorded information in the recording medium.

A fourth aspect of this invention provides an information recording and reproducing apparatus comprising first means for recording information representative of video contents on a first recording medium; second means for deciding whether or not a remaining usable capacity in the first recording medium corresponds to longer than a predetermined time during the recording of the video-contents information on the first recording medium by the first means; and third means for, when the second means decides that the remaining usable capacity in the first recording medium does not correspond to longer than the predetermined time, implementing a change from the first recording medium to a second recording medium and recording the video-contents information on the second recording medium instead of the first recording medium.

A fifth aspect of this invention is based on the first aspect thereof, and provides an information recording and reproducing apparatus further comprising fifth means for deciding whether or not the remaining usable capacity in the recording medium corresponds to longer than a prescribed time during the recording of the first video-contents information on the recording medium by the first means, the prescribed time being longer than the predetermined time, and sixth means for, when the fifth means decides that the remaining usable capacity in the recording medium does not correspond to longer than the prescribed time, warning a user of a shortage of the remaining usable capacity in the recording medium.

A sixth aspect of this invention provides a program-signal recording and reproducing apparatus comprising first means for accepting a reservation about recording of a designated program; second means for calculating a recording capacity necessary for the recording of the designated program; third means for detecting an unoccupied recording capacity in a recording medium; fourth means for subtracting the recording capacity calculated by the second means from the unoccupied recording capacity detected by the third means; fifth means for setting a result of the subtracting by the fourth means as a limit recording capacity; sixth means for recording the designated program on the recording medium; and seventh means for inhibiting signal recording on the recording medium to an extent beyond the limit recording capacity set by the fifth means before the sixth means starts recording the designated program on the recording medium.

A seventh aspect of this invention is based on the sixth aspect thereof, and provides a program-signal recording and reproducing apparatus further comprising eighth means for canceling the subtracting by the fourth means to reset the limit recording capacity immediately before the sixth means starts recording the designated program on the recording medium.

An eighth aspect of this invention provides a program-signal recording and reproducing apparatus comprising first means for accepting a reservation about recording of a designated program broadcasted in a same time range of a designated day of every week; second means for detecting whether or not the designated program broadcasted on the designated day of a previous week is present on a recording medium as a recorded program; third means for, in cases where the second means detects that the designated program broadcasted on the designated day of a previous week is not present on the recording medium as a recorded program, (1) calculating a recording capacity necessary for the recording of the designated program, (2) detecting an unoccupied recording capacity in the recording medium, (3) subtracting the calculated recording capacity from the detected unoccupied recording capacity, and (4) setting a result of the subtracting as a limit recording capacity; fourth means for recording the designated program in a current week on the recording medium in cases where the second means detects that the designated program broadcasted on the designated day of a previous week is not present on the recording medium as a recorded program; fifth means for inhibiting signal recording on the recording medium to an extent beyond the limit recording capacity set by the third means before the fourth means starts recording the designated program on the recording medium; and sixth means for, in cases where the second means detects that the designated program broadcasted on the designated day of a previous week is present on the recording medium as a recorded program, (1) releasing an area of the recording medium which stores the recorded program and adding the released area to the unoccupied recording capacity in the recording medium 104, and then (2) recording the designated program in a current week on the recording medium; wherein the sixth means implements releasing the area and adding the released area at a stage immediately preceding the execution of the recording of the designated program in the current week.

DETAILED DESCRIPTION OF THE INVENTION

First Embodiment

Figure 1:
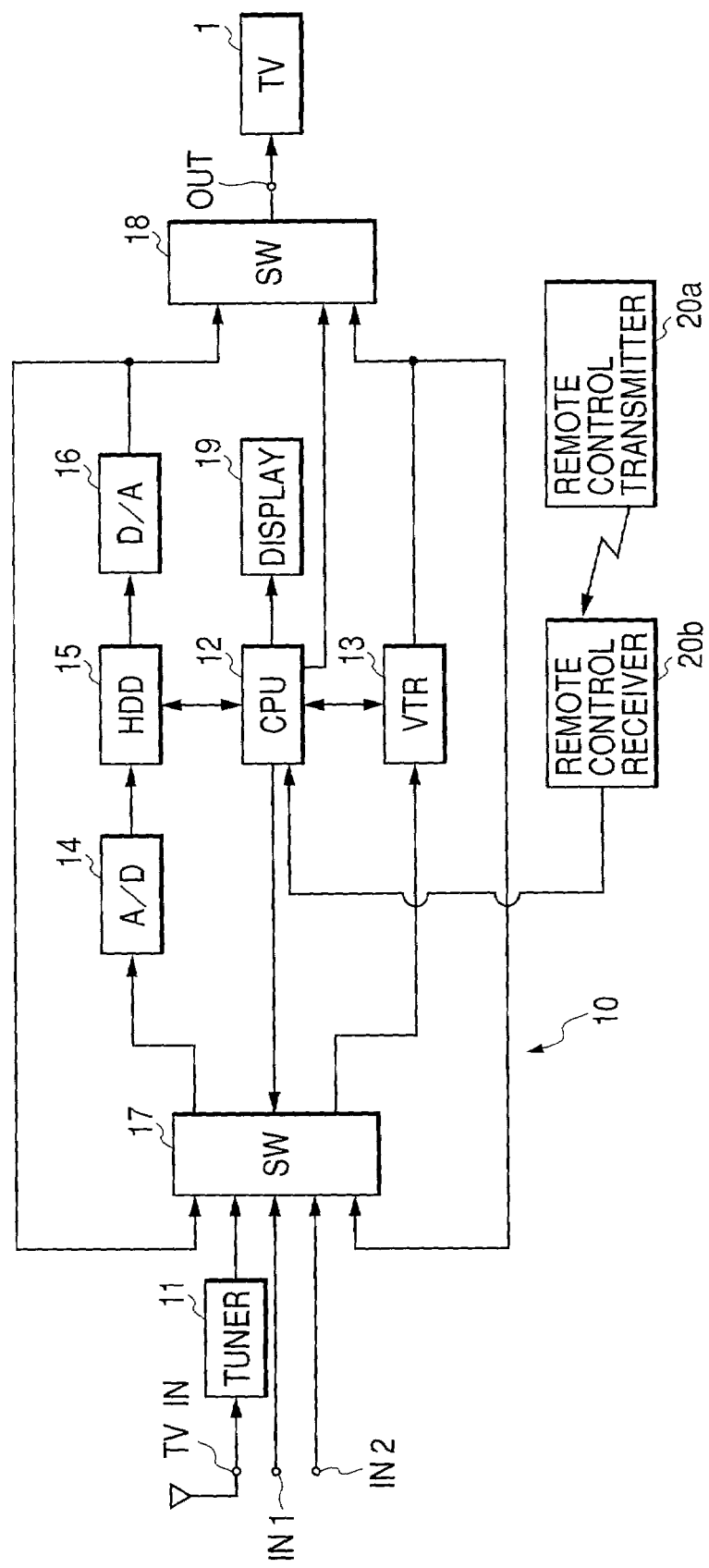
FIG. 1 is a block diagram of an information recording and reproducing apparatus according to a first embodiment of this invention.

FIG. 1 shows an information recording and reproducing apparatus 10 according to a first embodiment of this invention.

The apparatus 10 includes a television tuner 11, a CPU 12, a VTR (video tape recorder) 13, an A/D converter 14, an HDD (hard disk drive) 15, a D/A converter 16, switches 17 and 18, a display 19, a remote control transmitter 20a, a remote control receiver 20b, a television input terminal TVIN, input terminals IN1 and IN2, and an output terminal OUT. The HDD 15 includes a hard-disk accessing arrangement and signal processing circuits. The display 19 includes, for example, a liquid crystal display.

An antenna (no reference character) can be connected with the television input terminal TVIN. The television input terminal TVIN leads to the tuner 11. The tuner 11 is connected to the switch 17. The input terminals IN1 and IN2 are directly connected to the switch 17. The CPU 12 is connected with the VTR 13, the HDD 15, the switches 17 and 18, and the remote control receiver 20b. The VTR 13 is connected with the switches 17 and 18. The A/D converter 14 is connected between the switch 17 and the HDD The HDD 15 is connected with the D/A converter 16. The D/A converter 16 is connected with the switches 17 and 18. The switch 18 is connected with the output terminal OUT. A television receiver 1 can be connected with the output terminal OUT. The remote control transmitter 20a can communicate with the remote control receiver 20b by wireless.

The remote control transmitter 20a has a body provided with operation buttons such as channel selection CH1-CH12 buttons, an HDD button, a VHS button, "+"-arranged cursor-moving selection buttons, a decision (OK) button, an end (navigation) button, and a memory button. The operation buttons can be actuated by a user. When the operation buttons are actuated, the remote control transmitter 20a generates corresponding command signals. The remote control transmitter 20a sends the generated command signals to the remote control receiver 20b. The remote control receiver 20b transfers the command signals to the CPU 12.

The CPU 12 includes a combination of an input/output port, a processing section, a RAM, and a ROM. The CPU 12 operates in accordance with a control program stored in the ROM. The control program is designed to enable the CPU 12 to implement steps of operation which will be mentioned later. The CPU 12 controls the VTR 13, the HDD 15, the switches 17 and 18, and the display 19 in response to command signals fed via the remote control receiver 20b.

An RF television signal can be fed to the tuner 11 via the television input terminal TVIN. The tuner 11 converts the RF television signal into a baseband signal representative of a television program, that is, contents (video contents or audio/video contents). The tuner 11 outputs the contents signal to the switch 17. Signals representative of contents (video contents or audio/video contents) can be fed to the switch 17 via the input terminals IN1 and IN2. A contents signal outputted from the D/A converter 16 is fed to the switch 17. A contents signal outputted from the VTR 13 is fed to the switch 17.

The CPU 12 changes the switch 17 among different states. When the CPU 12 sets the switch 17 to its first state, the switch 17 selects designated one among the contents signal fed from the tuner 11, the contents signal fed via the input terminal IN1, the contents signal fed via the input terminal IN2, the contents signal fed from the D/A converter 16, and the contents signal fed from the VTR 13. The switch 17 transmits the selected contents signal to the A/D converter 14. Thus, in this case, the A/D converter 14 changes the selected contents signal into a corresponding digital contents signal, and outputs the digital contents signal to the HDD 15. The digital contents signal can be recorded by the HDD 15. When the CPU 12 sets the switch 17 to its second state, the switch 17 selects designated one among the contents signal fed from the tuner 11, the contents signal fed via the input terminal IN1, the contents signal fed via the input terminal IN2, the contents signal fed from the D/A converter 16, and the contents signal fed from the VTR 13. The switch 17 transmits the selected contents signal to the VTR 13. Thus, in this case, the selected contents signal can be recorded by the VTR 13. When the CPU 12 sets the switch 17 to its third state, the switch 17 selects first and second designated ones among the contents signal fed from the tuner 11, the contents signal fed via the input terminal IN1, the contents signal fed via the input terminal IN2, the contents signal fed from the D/A converter 16, and the contents signal fed from the VTR 13. The switch 17 transmits the first and second selected contents signals to the A/D converter 14 and the VTR 13, respectively. Thus, in this case, the A/D converter 14 changes the first selected contents signal into a corresponding digital contents signal, and outputs the digital contents signal to the HDD 15. The digital contents signal can be recorded by the HDD 15. At the same time, the second selected contents signal can be recorded by the VTR 13.

The HDD 15 is provided with a recording medium, that is, a hard disk. The HDD 15 receives the contents signal from the A/D converter 14. The HDD 15 can record the output signal (the contents signal) from the A/D converter 14 on the hard disk while being controlled by the CPU 12. The HDD 15 can reproduce the recorded contents signal from the hard disk while being controlled by the CPU 12. The HDD 15 outputs the reproduced contents signal to the D/A converter 16. The D/A converter 16 changes the reproduced contents signal into a corresponding analog contents signal. The D/A converter 16 outputs the analog contents signal to the switches 17 and 18.

The VTR 13 is provided with a removable recording medium, that is, a magnetic tape. The VTR 13 receives the selected contents signal from the switch 17. The VTR 13 can record the selected contents signal from the switch 17 on the magnetic tape while being controlled by the CPU 12. The VTR 13 can reproduce the recorded contents signal from the magnetic tape while being controlled by the CPU 12. The VTR 13 outputs the reproduced contents signal to the switches 17 and 18.

As mentioned above, the contents signal outputted from the D/A converter 16 is fed to not only the switch 17 but also the switch 18. Similarly, the contents signal outputted from the VTR 13 is fed to not only the switch 17 but also the switch 18. Under the control by the CPU 12, the switch 18 selects designated one out of the contents signal fed from the D/A converter 16 and the contents signal fed from the VTR 13. The switch 18 feeds the selected contents signal to the output terminal OUT. The selected contents signal is transmitted via the output terminal OUT to the television receiver 1. A video signal in the selected contents signal can be indicated on a display of the television receiver 1 while an audio signal therein can be converted into corresponding sounds by loudspeakers of the television receiver 1.

In the apparatus 10, the recording of a first contents signal by one of the VTR 13 and the HDD 15 and the reproduction of a second contents signal by the other can simultaneously be executed.

Figure 2:
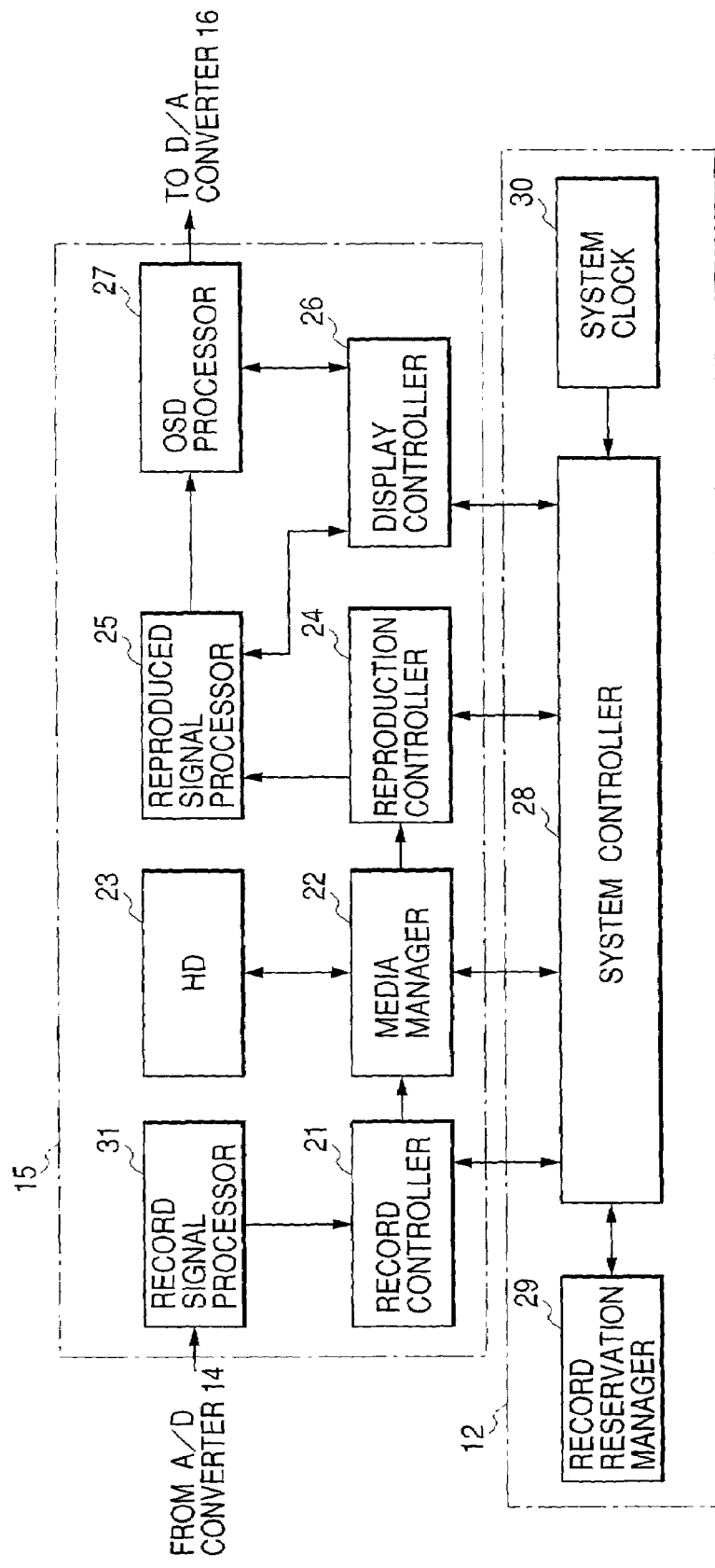
FIG. 2 is a block diagram of a CPU and an HDD in FIG. 1.

As shown in FIG. 2, the HDD 15 includes a record controller 21, a media manager 22, a hard disk 23, a reproduction controller 24, a reproduced signal processor 25, a display controller 26, an OSD (on-screen display) processor 27, and a record signal processor 31. The CPU 12 includes a system controller 28, a record reservation manager 29, and a system clock 30.

The record signal processor 31 follows the A/D converter 14. The record signal processor 31 is connected with the record controller 21. The record controller 21 is connected with the media manager 22 and the system controller 28. The media manager 22 can access the hard disk 23 which is a recording medium. The media manager 22 is connected with the reproduction controller 24 and the system controller 28. The reproduction controller 24 is connected with the reproduced signal processor 25 and the system controller 28. The reproduced signal processor 25 is connected with the display controller 26 and the OSD processor 27. The display controller 26 is connected with the OSD processor 27 and the system controller 28. The OSD processor 27 is followed by the D/A converter 16. The system controller 28 is connected with the record reservation manager 29 and the system clock 30. In addition, the system controller 28 is connected with the VTR 13, the switches 17 and 18, the display 19, and the remote control receiver 20*b* (see FIG. 1).

The record signal processor 31 receives the contents signal from the A/D converter 14. The record signal processor 31 includes a compressive encoder such as an MPEG encoder. Here, "MPEG" is short for Moving Picture Experts Group. The record signal processor 31 subjects the output signal of the A/D converter 14 to a compression process, for example, an MPEG-based compression process, to get the compression-resultant contents signal (the contents signal of the MPEG format). The record signal processor 31 outputs the compression-resultant contents signal to the record controller 21.

The record controller 21 adds auxiliary information to the compression-resultant contents signal. The record controller 21 stores the auxiliary-information-added contents signal into a buffer (not shown). The record controller 21 reads out the auxiliary-information-added contents signal from the buffer and outputs the read-out contents signal to the media manager 22 at a prescribed timing.

The media manager 22 converts the contents signal from the record controller 21 into a contents signal of a prescribed format suited for record on the hard disk 23. The media manager 22 includes an arrangement for accessing the hard disk 23. The media manager 22 records the prescribed-format contents signal on the hard disk 23. The media manager 22 can erase the recorded contents signal from the hard disk 23. The recording of a contents signal on the hard disk 23 and the erasure of another contents signal from the hard disk 23 can be alternately implemented by the media manager 22 on a time sharing basis. The media manager 22 reproduces the prescribed-format contents signal from the hard disk 23. The media manager 22 converts the reproduced contents signal into a contents signal of an original format equal to the format of a contents signal outputted from the record controller 21. The media manager 22 outputs the resultant contents signal to the reproduction controller 24.

The reproduction controller 24 stores the contents signal from the media manager 22 into a buffer (not shown). The reproduction controller 24 reads out the contents signal from the buffer and outputs the read-out contents signal to the reproduced signal processor 25 at a prescribed timing. In addition, the reproduction controller 24 extracts the auxiliary information from the contents signal. The reproduction controller 24 outputs the extracted auxiliary information to the system controller 28.

The reproduced signal processor 25 includes an expansive decoder such as an MPEG decoder. The reproduced signal processor 25 subjects the contents signal from the reproduction controller 24 to an expansion process, for example, an MPEG-based expansion process, to get the expansion-resultant contents signal. The expansion process is inverse with respect to the compression process by the record signal processor 31. The reproduced signal processor 25 outputs the expansion-resultant contents signal to the OSD processor 27. The expansion-resultant contents signal has a set of a video signal and an audio signal. The reproduction signal processor 25 generates a sync signal related to the video signal. The reproduction signal processor 25 outputs the sync signal to the display controller 26.

The OSD processor 27 adds on-screen information (OSI) to the contents signal outputted from the reproduced signal processor 25. In other words, the OSD processor 27 superimposes the on-screen information (OSI) on the contents signal outputted from the reproduced signal processor 25. The OSD processor 27 outputs the OSI-added contents signal to the D/A converter 16. The display controller 26 controls the OSD processor 7 on the basis of a timing determined by the sync signal fed from the reproduced signal processor 25.

The record reservation manager 29 includes a memory storing information of program reservations. The record reservation manager 29 sends and receives information to and from the system controller 28. The system clock 30 feeds information of the present date and information of the present time to the system controller 28.

The system controller 28 controls the record controller 21, the media manager 22, the reproduction controller 24, and the display controller 26 while sending and receiving information to and from the devices 21, 22, 24, and 26. In addition, the system controller 28 controls the VTR 13, the switches 17 and 18, and the display 19. The system controller 28 includes, for example, a microcomputer or a similar device having a combination of an input/output port, a processing section, a RAM, and a ROM. The system controller 28 operates in accordance with a control program stored in the ROM. The control program is designed to enable the system controller 28 to implement steps of operation which will be mentioned later.

The ROM or another memory in the system controller 28 stores image files and text data. The system controller 28 generates a signal representative of an HDD navigation picture of the GUI type and a signal representative of a VTR navigation picture of the GUI type on the basis of the image files and the text data. Here, "GUI" is short for Graphical User Interface. The system controller 28 compresses the signal of the HDD navigation picture and the signal of the VTR navigation picture according to, for example, the JPEG (Joint Photographic Experts Group) standards. The system controller 28 outputs the compression-resultant signal of the HDD navigation picture and the compression-resultant signal of the VTR navigation picture to the media manager 22. The system controller 28 controls the media manager 22, thereby recording the compression-resultant signal of the HDD navigation picture and the compression-resultant signal of the VTR navigation picture on the hard disk 23.

Operation of the apparatus 10 can be changed among various modes in response to command signals inputted via the remote control transmitter 20a. The modes of operation of the apparatus include an HDD recording mode, an HDD playback mode, an HDD navigation mode, a normal dubbing mode, a continuous dubbing mode, and a midnight dubbing mode.

The HDD recording mode of operation of the apparatus 10 is started when a record command signal is inputted into the system controller 28 via the remote control transmitter 20a and the remote control receiver 20b. During the HDD recording mode of operation of the apparatus 10, the switch 17 is controlled by the system controller 28 to select designated one among the contents signal fed from the tuner 11, the contents signal fed via the input terminal IN1, the contents signal fed via the input terminal IN2, the contents signal fed from the D/A converter 16, and the contents signal fed from the VTR 13. The switch 17 transmits the selected contents signal to the A/D converter 14. The A/D converter 14 changes the selected contents signal into a corresponding digital contents signal. The A/D converter 14 outputs the digital contents signal to the record signal processor 31. The record signal processor 31 converts the output signal of the A/D converter 14 into a compressed contents signal of the MPEG format. The record signal processor 31 outputs the MPEG contents signal to the record controller 21. On the other hand, the system controller 28 receives the present-date information and the present-time information from the system clock 30. The system controller 28 transfers the present-date information and the present-time information to the record controller 21. The record controller 21 generates a frame information related to the MPEG contents signal. The record controller 21 combines the present-date information, the present-time information, and the frame information into auxiliary information. The record controller 21 adds the auxiliary information to the MPEG contents signal. The added auxiliary information is equivalent to information of the broadcasting time or the on-air time (the on-air time stamp) of the contents signal. The record controller 21 has an internal buffer. The record controller 21 stores the auxiliary-information-added contents signal into the internal buffer.

During the HDD recording mode of operation of the apparatus 10, the record controller 21 is controlled by the system controller 28 so that the auxiliary-information-added contents signal is read out from the buffer in the record controller 21 and is outputted to the media manager 22. The media manager 22 is controlled by the system controller 28, thereby converting the contents signal from the record controller 21 into a contents signal of the prescribed format suited for record on the hard disk 23. The media manager 22 records the prescribed-format contents signal on the hard disk 23 while being controlled by the system controller 28. The contents signal recorded on the hard disk 23 contains the auxiliary information. Under the control by the system controller 28, the media manager 22 generates program-related information which represents the relation between the added auxiliary information and the addresses on the recording medium 4 at which the recorded contents signal is located. The media manager 22 records the program-related information on the hard disk 23 in addition to the auxiliary-information-added contents signal.

The system controller 28 receives, from the media manager 22, a signal representing a picture in a program represented by the contents signal which occurs at the start of the recording of the program (the contents signal). The system controller 28 converts the signal representative of the program start picture into a signal indicative of a thumbnail. The system controller 28 outputs the thumbnail signal to the media manager 22. The system controller 28 controls the media manager 28, thereby recording the thumbnail signal on the hard disk 23 in connection with the signals of the HDD navigation picture and the VTR navigation picture. Thumbnails (or thumbnail signals) are generated for recorded programs, respectively.

In general, the system controller 28 is informed of a designated playback start point (a desired playback start point) via the remote control transmitter 20a and the remote control receiver 20b when the apparatus 10 is required to operate in the HDD playback mode. The system controller 28 notifies the media manager 22 of the designated playback start point. The HDD playback mode of operation of the apparatus 10 is started when a playback command signal is inputted into the system controller 28 via the remote control transmitter 20a and the remote control receiver 20b. Specifically, in response to the playback command signal, the system controller 28 controls the media manager 22 to read out the program-related information from the hard disk 23. The media manager 22 refers to the program-related information, and thereby determines a start address on the hard disk 23 which corresponds to the designated playback start point. The media manager 22 accesses the point on the hard disk 23 which is designated by the start address. The media manager 22 reproduces a designated contents signal from the hard disk 23 at the start address and subsequent addresses while being controlled by the system controller 28. Under the control by the system controller 28, the media manager 22 converts the reproduced contents signal into a contents signal of an original format equal to the format of a contents signal outputted from the record controller 21. The media manager 22 outputs the resultant contents signal to the reproduction controller 24. The reproduction controller 24 has an internal buffer. The reproduction controller 24 stores the contents signal from the media manager 22 into the internal buffer. Under the control by the system controller 28, the reproduction controller 24 reads out the contents signal from the internal buffer. The reproduction controller 24 extracts the auxiliary information from the read-out contents signal.

During the HDD playback mode of operation of the apparatus 10, the reproduction controller 24 outputs the read-out contents signal to the reproduced signal processor 25. In addition, the reproduction controller 24 outputs the extracted auxiliary information to the system controller 28. The reproduced signal processor 25 subjects the contents signal from the reproduction controller 24 to the expansion process, for example, the MPEG-based based expansion process, to get the expansion-resultant contents signal. The reproduced signal processor 25 outputs the expansion-resultant contents signal to the OSD processor 27. The expansion-resultant contents signal has a set of a video signal and an audio signal. The reproduction signal processor 25 generates a sync signal related to the video signal. The reproduction signal processor 25 outputs the sync signal to the display controller 26. The system controller 28 transfers the auxiliary information from the reproduction controller 24 to the display controller 26. The display controller 26 controls the OSD processor 27 in response to the sync signal from the reproduced signal processor 25 and the auxiliary information from the system controller 28 so that the OSD processor 27 adds suitable on-screen information (OSI) to the contents signal outputted from the reproduced signal processor 25. The on-screen information originates from the auxiliary information. The OSD processor 27 outputs the OSI-added contents signal to the D/A converter 16. The D/A converter 16 changes the output signal of the OSD processor 27 into an analog OSI-added contents signal. The D/A converter 16 outputs the analog OSI-added contents signal to the switch 18. The switch 18 is controlled by the system controller 28, transmitting the analog OSI-added contents signal to the television receiver 1. A video signal in the analog OSI-added contents signal is indicated on the display of the television receiver 1 while an audio signal therein is converted into corresponding sounds by the loudspeakers of the television receiver 1.

The normal dubbing mode of operation of the apparatus 10 is started in response to a corresponding command signal inputted via the remote control transmitter 20a. In connection with the normal-dubbing command signal, the system controller 28 is informed of a program requested to be dubbed. During the normal dubbing mode of operation of the apparatus 10, the system controller 28 controls the media manager 22 in response to the normal-dubbing command signal and the requested-program information, thereby reproducing the contents signal representative of the requested program from the hard disk 23. The reproduced contents signal is transmitted from the media manager 22 to the D/A converter 16 via the reproduction controller 24, the reproduced signal processor 25, and the OSD processor 27. The D/A converter 16 changes the reproduced contents signal into an analog contents signal representative of the requested program. The D/A converter 16 outputs the analog contents signal to the switch 17. The switch 17 passes the output signal of the D/A converter 16 to the VTR 13 while being controlled by the system controller 28. The VTR 13 records the incoming contents signal on the magnetic tape while being controlled by the system controller 28. Thus, the requested program is dubbed onto the magnetic tape.

The continuous dubbing mode and midnight dubbing mode of operation of the apparatus 10 are similar to the normal dubbing mode of operation thereof except for the following points. During the continuous dubbing mode of operation of the apparatus 10, a plurality of requested programs is continuously dubbed from the hard disk 23 onto the magnetic tape in the VTR 13. The midnight dubbing mode of operation of the apparatus 10 is automatically executed during a preset time range.

When the navigation button (the end button) on the remote control transmitter 20a is depressed, a corresponding command signal (a navigation command signal) is transmitted from the remote control transmitter 20a to the system controller 28 via the remote control receiver 20b. The system controller 28 controls the media manager 22 in response to the navigation command signal, thereby reproducing the compression-resultant signal of the HDD navigation picture and the compression-resultant signal of the VTR navigation picture from the hard disk 23. The system controller 28 expands the reproduced signal of the HDD navigation picture and the reproduced signal of the VTR navigation picture. The system controller 28 outputs the expansion-resultant signal of the HDD navigation picture and the expansion-resultant signal of the VTR navigation picture to the reproduction controller 24. The reproduction controller 24 and the switch 18 are controlled by the system controller 28 so that the signal of the HDD navigation picture and the signal of the VTR navigation picture can be transmitted from the reproduction controller 24 to the television receiver 1 via the reproduced signal processor 25, the OSD processor 27, the D/A converter 16, and the switch 18. Accordingly, the HDD navigation picture and the VTR navigation picture can be indicated on the display of the television receiver 1. In addition, the system controller 28 controls the media manager 22, thereby reproducing the thumbnail signals from the hard disk 23. The system controller 28 transfers the thumbnail signals from the media manager 22 to the display controller 26. The display controller 26 feeds the thumbnail signals to the OSD processor 27. The OSD processor 27 superimposes the thumbnail signals on the signal of the HDD navigation picture and the signal of the VTR navigation picture. Thus, the HDD navigation picture and the VTR navigation picture indicated on the display of the television receiver 1 have the thumbnails.

Figure 3:
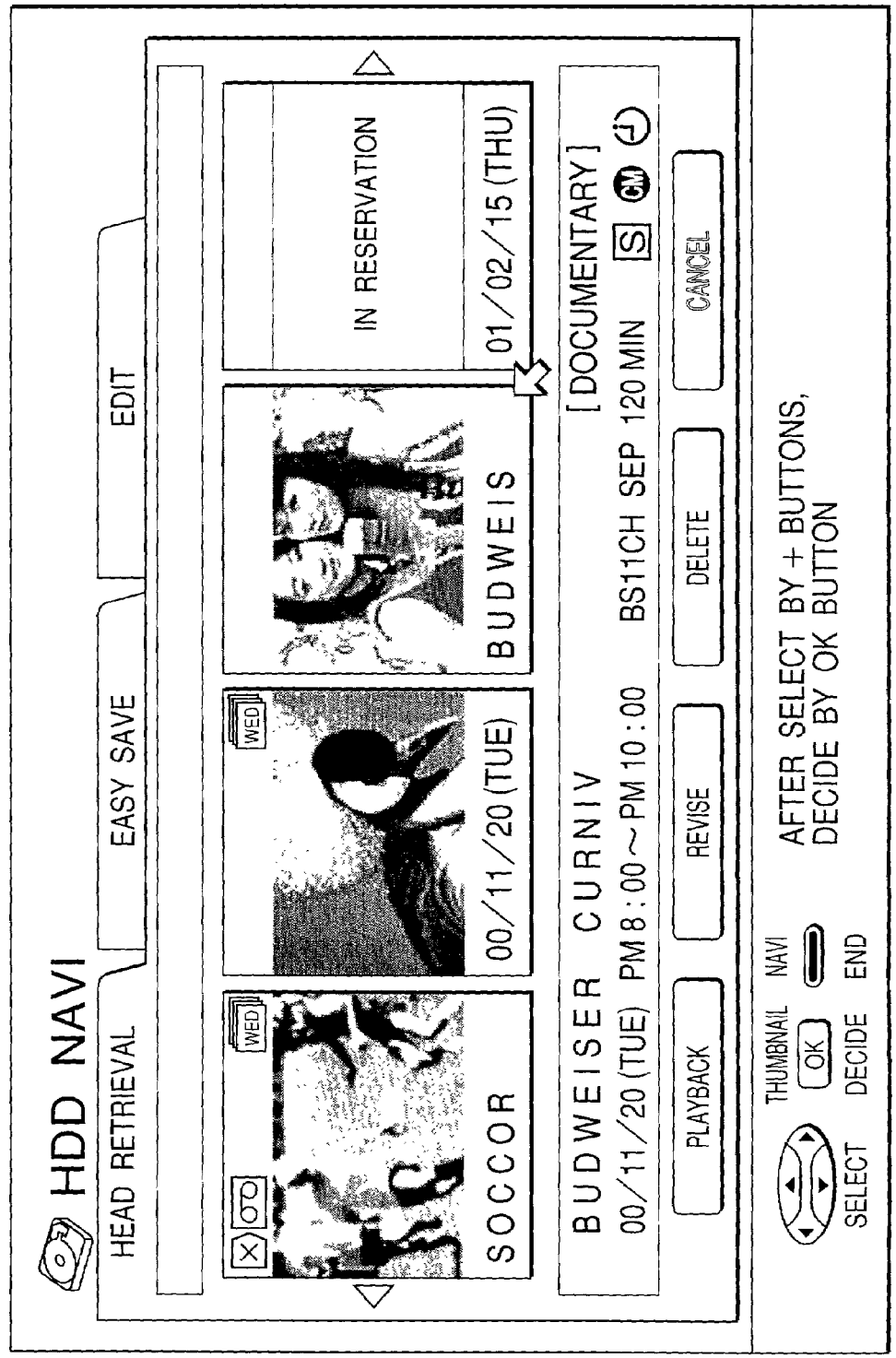
FIG. 3 is a diagram of an example of a head retrieval page in an HDD navigation picture.
Figure 4:
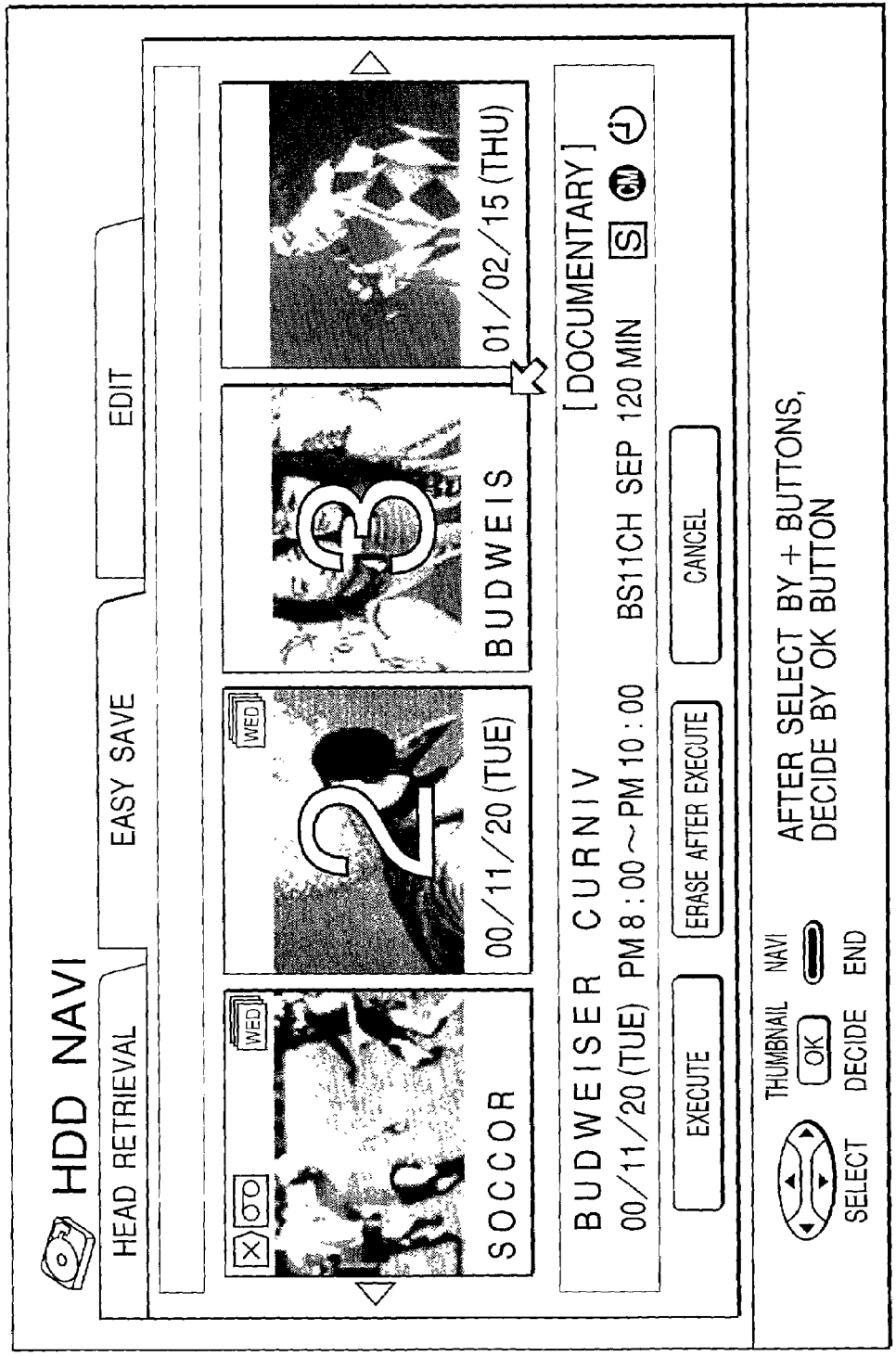
FIG. 4 is a diagram of an example of an easy save page in the HDD navigation picture.

The HDD navigation picture has three basic pages, that is, a head retrieval page, an easy save page, and an editing page. The head retrieval page is designed for retrieving the heads of the respective recorded contents (the respective recorded programs) on the hard disk 23. An example of the head retrieval page is shown in FIG. 3. The easy save page is designed for copying a contents signal (a program) from the hard disk 23 onto the magnetic tape in the VTR 13. An example of the easy save page is shown in FIG. 4. Each of the head retrieval page, the easy save page, and the editing page has a set of thumbnails. Each of the head retrieval page, the easy save page, and the editing page includes three tags corresponding to the three basic pages respectively. Any one of the head retrieval page, the easy save page, and the editing page is selected and indicated by designating the corresponding tag. Detailed pages are linked with each of the three basic pages. A deletion-related page is an example of one of the detailed pages.

A lower area of every page of the HDD navigation picture and the VTR navigation picture indicates a guidance as to operation of the "+"-arranged cursor-moving selection buttons, the decision (OK) button, and the end (navigation) button on the remote control transmitter 20*a*. Every page of the HDD navigation picture and the VTR navigation picture has a cursor. By operating the "+"-arranged cursor-moving selection buttons, the cursor is moved among limited positions including button positions and tag positions according to a GUI picture.

The apparatus 10 has an HDD navigation function corresponding to the HDD navigation mode of operation. The features of the HDD navigation function are as follows.

(A1) Navigation data are recorded on the hard disk 23.

(A2) The maximum number of programs (programs represented by the contents signals) subjected to navigation is equal to 60.

(A3) Program genres are of 12 to 16 types.

(A4) Each program title is denoted by at most 15 letters and characters.

(A5) A program picture which occurs at the start of the recording of a program is registered as a thumbnail. Regarding the reservation-based recording of a program of less than 5 minutes, a program picture occurring at the start of the recording is registered as a thumbnail. Regarding the reservation-based recording of a program of 5 minutes or longer, a program picture occurring at the start of the recording is registered as a thumbnail, and the thumbnail is updated to a program picture occurring 5 minutes thereafter.

(A6) A thumbnail can be replaced by revised one.

(A7) When a thumbnail is designated by the cursor, detailed information related to the thumbnail is indicated in a picture portion below the thumbnail. The detailed information represents a program title, a recording date, a recording channel, a recording time, a genre, and an icon.

(A8) A playback button, a revise button, a deletion button, and a cancel button are indicated in a picture area below the detailed information.

The apparatus 10 has a head-retrieval-page indicating function regarding the HDD navigation picture. The features of the head-retrieval-page indicating function are as follows.

(B1) When the end (navigation) button on the remote control transmitter 20*a* is depressed under the conditions where the power supply to the apparatus 10 is in an on state, the head retrieval page of the HDD navigation picture is indicated on the display of the television receiver 1. The cursor initially points to the thumbnail corresponding to the latest recorded program. The cursor can be moved among the thumbnails in accordance with operation of the "+"-arranged cursor-moving selection buttons on the remote control transmitter 20*a*. The thumbnails can be scrolled in accordance with operation of the "+"-arranged cursor-moving selection buttons.

(B2) The thumbnails are indicated in the order corresponding to the order of the recording of the related programs. A program in reservation is denoted by the message "in reservation" placed in the last one among picture sections for the thumbnails.

(B3) When the decision (OK) button on the remote control transmitter 20*a* is depressed under the conditions where one of the thumbnails is designated by the cursor, the cursor is moved to the playback button in the indicated picture. When the decision (OK) button is depressed, the program corresponding to the thumbnail designated by the cursor starts to be played back.

(B4) In the case where the continuous playback of a plurality of programs is requested, when one of the thumbnails is designated by the cursor and the memory button on the remote control transmitter 20*a* is depressed, the playback order number of the program corresponding to the designated thumbnail is registered, and is indicated on the designated thumbnail as shown in FIG. 4. Then, the cursor is moved to the playback button in the indicated picture. When the decision (OK) button on the remote control transmitter 20*a* is depressed, the continuous playback of a plurality of programs is started.

The apparatus 10 has an easy-save-page indicating function regarding the HDD navigation picture. The features of the easy-save-page indicating function are as follows.

(C1) When the decision (OK) button on the remote control transmitter 20*a* is depressed under the conditions where the easy save tag is designated by the cursor, the easy save page of the HDD navigation picture is indicated on the display of the television receiver 1. An example of the easy save page is shown in FIG. 4. The contents of the easy save page are substantially similar to those of the head retrieval page except for buttons of "execute", "erase-after-execute", and "cancel".

(C2) The thumbnails are indicated in the order corresponding to the order of the recording of the related programs. A program in reservation is denoted by the message "in reservation" placed in the last one among picture sections for the thumbnails.

(C3) When the decision (OK) button on the remote control transmitter 20*a* is depressed under the conditions where one of the thumbnails is designated by the cursor, the cursor is moved to the "execute" button in the indicated picture. When the decision (OK) button is depressed under the conditions where the "execute" button or the "erase-after-execute" button is designated by the cursor, a tape insertion message is indicated. When the decision (OK) button is depressed then, the program corresponding to the designated thumbnail starts to be dubbed from the hard disk 23 onto the magnetic tape in the VTR 13.

(C4) In the case where the continuous dubbing of a plurality of programs is requested, when one of the thumbnails is designated by the cursor and the memory button on the remote control transmitter 20*a* is depressed, the dubbing order number of the program corresponding to the designated thumbnail is registered, and is indicated on the designated thumbnail as shown in FIG. 4. Then, the cursor is moved to the "execute" button or the "erase-after-execute" button in the indicated picture. When the decision (OK) button on the remote control transmitter 20*a* is depressed, the continuous dubbing of a plurality of programs is started.

(C5) In the case where the "execute" button is selected at the time of the completion of the dubbing, the original program or programs are left in the hard disk 23. In addition, the thumbnail signal or signals corresponding to the dubbed program or programs are copied from the HDD navigation data area of the hard disk 23 onto the VHS navigation data area thereof. The thumbnail signal or signals remain in the HDD navigation data area. In the case where the "erase-after-execute" button is selected at the time of the completion of the dubbing, the original program or programs are erased from the hard disk 23. In addition, the thumbnail signal or signals corresponding to the dubbed program or programs are moved from the HDD navigation data area of the hard disk 23 onto the VHS navigation data area thereof. The thumbnail signal or signals are erased from the HDD navigation data area. In the event that the dubbing has failed, the original program or programs are prevented from being erased from the hard disk 23. Also, the thumbnail signal or signals are prevented from being erased from the HDD navigation data area.

Figure 5:
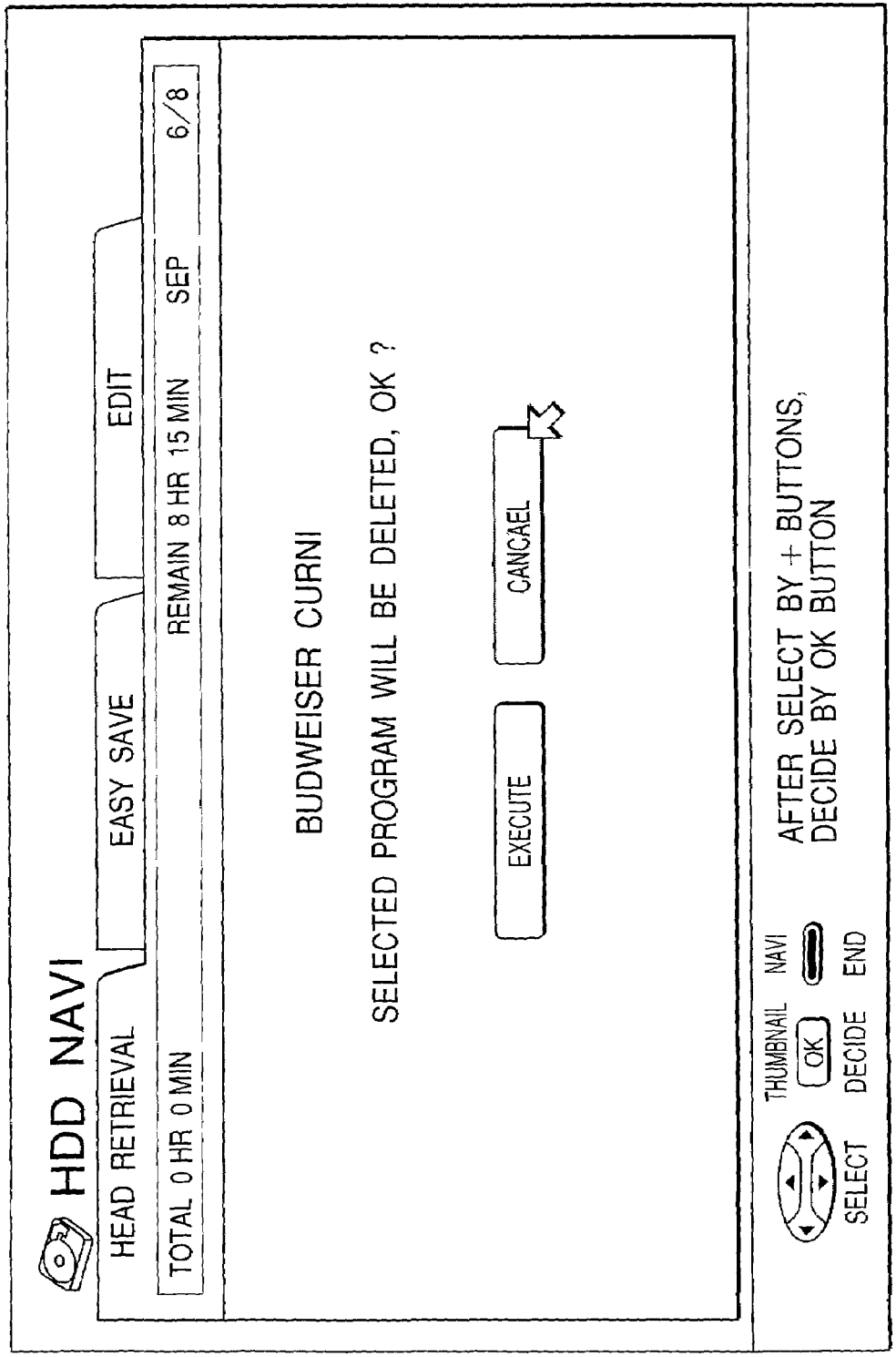
FIG. 5 is a diagram of an example of a deletion-related page in the HDD navigation picture.

The apparatus 10 has a program deleting function regarding the HDD navigation picture. The features of the program deleting function are as follows. When the decision (OK) button on the remote control transmitter 20a is depressed under the conditions where one of the thumbnails is designated by the cursor in the head retrieval page of the HDD navigation picture, the cursor is moved to the playback button in the head retrieval page. In this case, the cursor can be further moved to the deletion button in the head retrieval page by operation of the "+"-arranged cursor-moving selection buttons on the remote control transmitter 20a. When the decision (OK) button on the remote control transmitter 20a is depressed under the conditions where the deletion button is designated by the cursor in the head retrieval page, a deletion-related picture (a deletion-related page in the HDD navigation picture) such as shown in FIG. 5 is indicated and the cursor points to a "cancel" button in the deletion-related picture. In this case, the cursor can be moved to an "execute" button in the deletion-related picture by operation of the "+"-arranged cursor-moving selection buttons on the remote control transmitter 20a. When the decision (OK) button on the remote control transmitter 20a is depressed under the conditions where the "execute" button is designated by the cursor in the deletion-related picture, the program corresponding to the thumbnail, which has been designated by the cursor in the head retrieval page, is erased from the hard disk 23.

The display 19 has a portion formed with a message designed to warn of a shortage of a usable capacity in the hard disk 23. The message portion of the display 19 is selectively activated and deactivated by the system controller 28. The apparatus 10 implements an automatic program deleting process during the HDD recording mode of operation.

Figure 6:
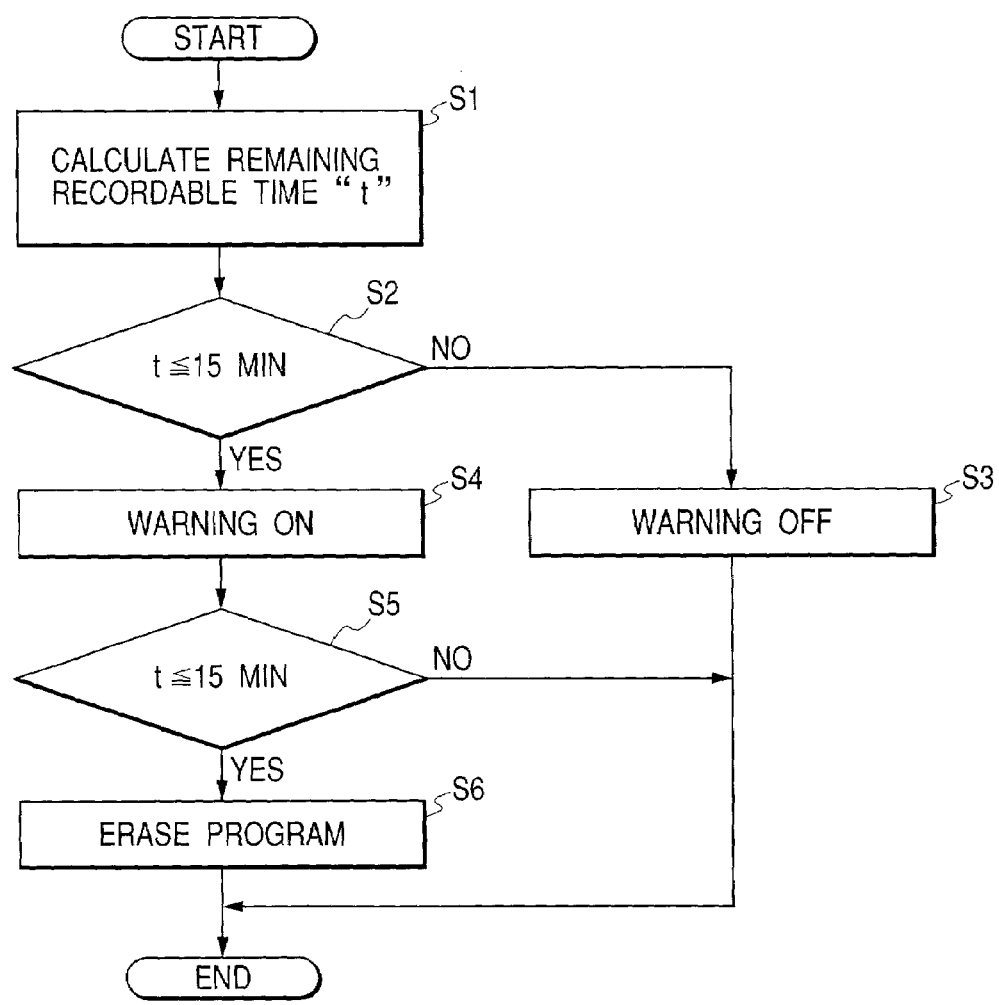
FIG. 6 is a flowchart of a segment (a subroutine) of a control program for a system controller in FIG. 2 which relates to an automatic program deleting process.

FIG. 6 is a flowchart of a segment (a subroutine) of the control program for the system controller 28 which relates to the automatic program deleting process. During the HDD recording mode of operation of the apparatus 10, the control-program segment in FIG. 6 is repetitively executed. Thus, during the recording of a contents signal on the hard disk 23, the control-program segment in FIG. 6 is repetitively executed.

With reference to FIG. 6, a first step S1 of the control-program segment accesses the media manager 22 to get information about the usable capacity (the size of an unused or unoccupied area) in the hard disk 23, and also information about the bit rate of the contents signal which is being recorded on the hard disk 23. The step S1 calculates a remaining recordable time "t" from the usable capacity in the hard disk 23 and the bit rate of the recorded contents signal. For example, the calculated remaining recordable time "t" is about 222 minutes when the usable capacity in the hard disk 23 is 10 Gbytes and the bit rate of the recorded contents signal is 6 Mbytes/sec.

A step S2 following the step S1 compares the remaining recordable time "t" with a first predetermined reference time (for example, 15 minutes). When the remaining recordable time "t" is longer than the first predetermined reference time, the control program advances from the step S2 to a step S3. On the other hand, when the remaining recordable time "t" is equal to or shorter than the first predetermined reference time, the control program advances from the step S2 to a step S4.

The step S3 deactivates the warning message portion of the display 19. After the step S3, the current execution cycle of the control-program segment ends.

The step S4 activates the warning message portion of the display 19. As a result, the user is warned of a shortage of a usable capacity in the hard disk 23. After the step S4, the control program advances to a step S5.

The step S5 compares the remaining recordable time "t" with a second predetermined reference time (for example, 5 minutes) shorter than the first predetermined reference time. When the remaining recordable time "t" is longer than the second predetermined reference time, the control program exits from the step S5 and then the current execution cycle of the control-program segment ends. On the other hand, when the remaining recordable time "t" is equal to or shorter than the second predetermined reference time, the control program advances from the step S5 to a step S6.

The step S6 controls the media manager 22 to erase at least a portion of a prescribed program (a prescribed contents signal) from the hard disk 23. The prescribed program is, for example, the oldest one among the programs (the contents signals) in the hard disk 23, or specified one among the programs (the contents signals) in the hard disk 23 which has already been played back. After the step S6, the current execution cycle of the control-program segment ends.

As previously mentioned, the control-program segment in FIG. 6 is repetitively executed during the recording of a contents signal on the hard disk 23. In general, the recording of a program (a contents signal) on the hard disk 23 and the erasure of a prescribed program (a prescribed contents signal) from the hard disk 23 are alternately executed on a time sharing basis. The erasure of the prescribed contents signal from the hard disk 23 enables the recording of the current contents signal on the hard disk 23 to be maintained even in the event that the remaining usable area in the hard disk 23 becomes small (the remaining recordable time becomes short).

The prescribed program (the prescribed contents signal) to be deleted by the step S6 in FIG. 6 may be previously chosen in response to user's command. A plurality of programs (contents signals) may be deleted by the step S6. In this case, the order of deleting the programs may be previously chosen in response to user's command.

In the case where a usable magnetic tape is in the VTR 13 or in the case where a magnetic tape is placed into the VTR 13 after the display 19 warns of a shortage of a usable capacity in the hard disk 23, the recording medium on which the contents signal is being recorded may be changed from the hard disk 23 to the magnetic tape by controlling the switch 17 and other devices.

During a specified mode of operation of the apparatus 10, a first program (a first contents signal) is recorded on the hard disk 23 while a second program (a second contents signal) is reproduced from the hard disk 23 and is dubbed onto a magnetic tape in the VTR 13. In the case of a shortage of a usable capacity in the hard disk 23, the first program may be recorded over the second program on the hard disk 23 which has already been dubbed.

Second Embodiment

Figure 7:
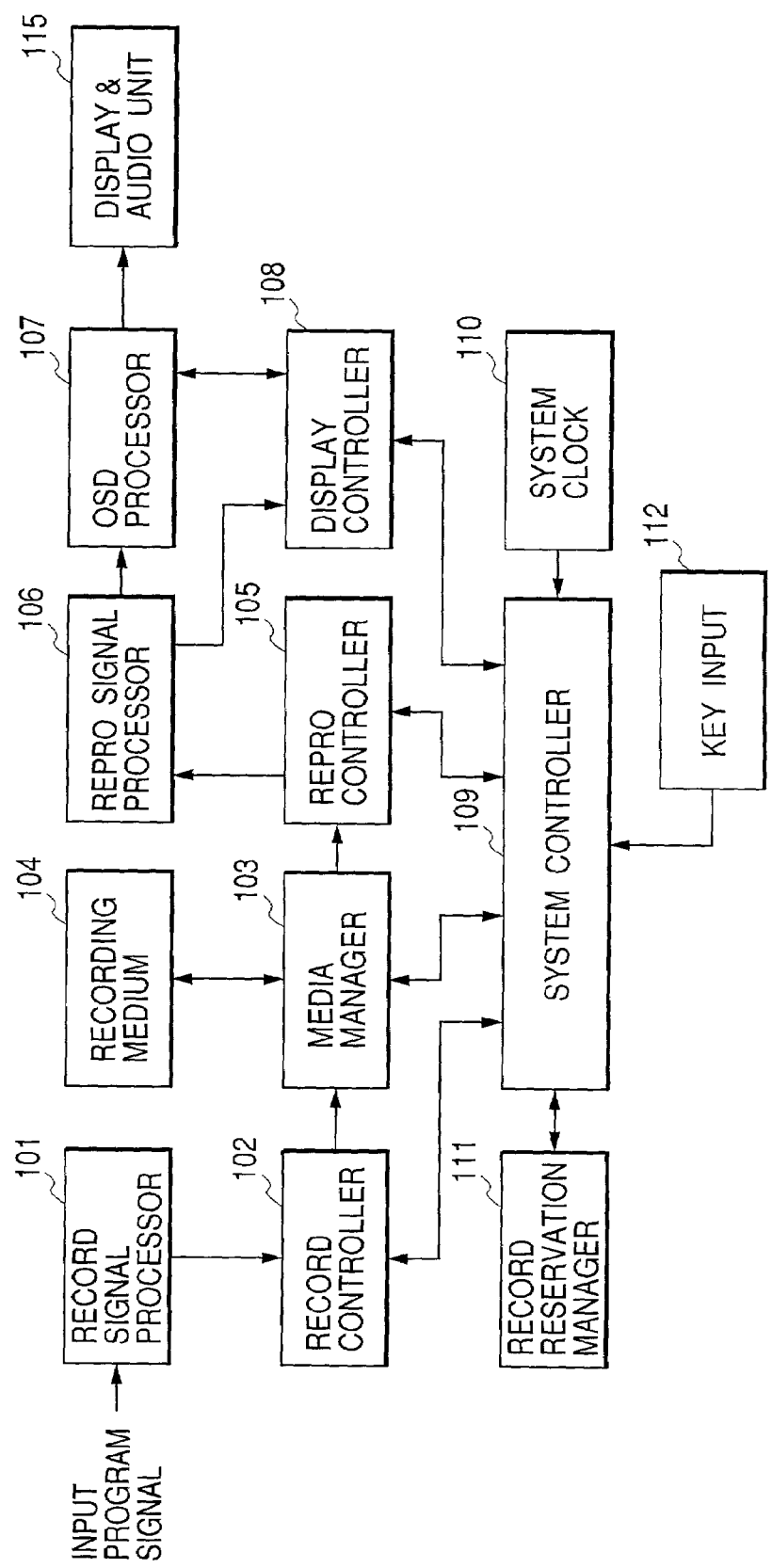
FIG. 7 is a block diagram of a program-signal recording and reproducing apparatus (an information recording and reproducing apparatus) according to a second embodiment of this invention.

FIG. 7 shows a program-signal recording and reproducing apparatus (an information recording and reproducing apparatus) according to a second embodiment of this invention.

The apparatus of FIG. 7 can be connected with, for example, a television receiver or both a tuner and a television receiver. In the apparatus of FIG. 7, a record signal processor 101 is connected with a record controller 102. The record controller 102 is connected with a media manager 103 and a system controller 109. The media manager 103 can access a recording medium 104 which includes, for example, a hard disk or a semiconductor memory. The media manager 103 is connected with a reproduction controller 105 and the system controller 109. The reproduction controller 105 is connected with a reproduced signal processor 106 and the system controller 109. The reproduced signal controller 106 is connected with an OSD (on-screen display) processor 107 and a display controller 108. The OSD processor 107 is connected with the display controller 108. The display controller 108 is connected with the system controller 109. The system controller 109 is connected with a system clock 110, a record reservation manager 111, and a key input unit 112.

The record signal processor 101 can be connected with, for example, a tuner or a television receiver. A program signal to be recorded, that is, a signal representing a program to be recorded, is inputted into the record signal processor 101 from, for example, the tuner or the television receiver. The program signal is composed of a video signal and an audio signal. The record signal processor 101 includes a compressive encoder such as an MPEG encoder. Here, "MPEG" is short for Moving Picture Experts Group. The record signal processor 101 subjects the input program signal to a compression process, for example, an MPEG-based compression process, to get the compression-resultant program signal (the program signal of the MPEG format). The record signal processor 101 outputs the compression-resultant program signal to the record controller 102.

The record controller 102 adds auxiliary information to the compression-resultant program signal. The record controller 102 stores the auxiliary-information-added program signal into a buffer (not shown). The record controller 102 reads out the auxiliary-information-added program signal from the buffer and outputs the read-out program signal to the media manager 103 at a prescribed timing.

The media manager 103 converts the program signal from the record controller 102 into a program signal of a prescribed format suited for record on the recording medium 104. The media manager 103 includes a drive for the recording medium 104. The media manager 103 records the prescribed-format program signal on the recording medium 104. The media manager 103 reproduces the prescribed-format program signal from the recording medium 104. The media manager 103 converts the reproduced program signal into a program signal of an original format equal to the format of a program signal outputted from the record controller 102. The media manager 103 outputs the resultant program signal to the reproduction controller 105.

The reproduction controller 105 stores the program signal from the media manager 103 into a buffer (not shown). The reproduction controller 103 reads out the program signal from the buffer and outputs the read-out program signal to the reproduced signal processor 106 at a prescribed timing. In addition, the reproduction controller 105 extracts the auxiliary information from the program signal. The reproduction controller 105 outputs the extracted auxiliary information to the system controller 109.

The reproduced signal processor 106 includes an expansive decoder such as an MPEG decoder. The reproduced signal processor 106 subjects the program signal from the reproduction controller 105 to an expansion process, for example, an MPEG-based expansion process, to get the expansion-resultant program signal. The expansion process is inverse with respect to the compression process by the record signal processor 101. The reproduced signal processor 106 outputs the expansion-resultant program signal to the OSD processor 107. The expansion-resultant program signal has a set of a video signal and an audio signal. The reproduction signal processor 106 generates a sync signal related to the video signal. The reproduction signal processor 106 outputs the sync signal to the display controller 108.

The OSD processor 107 adds on-screen information (OSI) to the program signal outputted from the reproduced signal processor 106. In other words, the OSD processor 107 superimposes the on-screen information (OSI) on the program signal outputted from the reproduced signal processor 106. The OSD processor 107 can be connected with, for example, a display and audio unit 115 of the television receiver. The OSD processor 107 outputs the OSI-added program signal to, for example, the display and audio unit 115 of the television receiver. A video signal in the OSI-added program signal can be indicated on a display of the television receiver while an audio signal therein can be converted into corresponding sounds by loudspeakers of the television receiver. The display controller 108 controls the OSD processor 107 on the basis of a timing determined by the sync signal fed from the reproduced signal processor 106.

The system controller 109 controls the record controller 102, the media manager 103, the reproduction controller 105, and the display controller 108 while sending and receiving information to and from the devices 102, 103, 105, and 108. The system controller 109 includes, for example, a microcomputer or a similar device having a combination of an input/output port, a processing section, a RAM, and a ROM. The system controller 109 operates in accordance with a control program stored in the ROM. The control program is designed to enable the system controller 109 to implement steps of operation which will be mentioned later.

The system clock 110 feeds information of the present date and information of the present time to the system controller 109. The record reservation manager 111 includes a memory storing information of program reservations. The record reservation manager 111 sends and receives information to and from the system controller 109. The key input unit 112 can be operated by a user. The key input unit 112 outputs signals of user's commands to the system controller 109 when being operated by the user. The key input unit 112 includes an array of keys or buttons provided on the body of the apparatus. The key input unit 112 may include a combination of a remote control transmitter and a remote control receiver, or an external device connected via an interface such as an IEEE1394 interface.

Operation of the apparatus of FIG. 7 can be changed among various modes in response to command signals inputted via the key input unit 112. The modes of operation of the apparatus includes recording modes, playback modes, and a stand-by mode. The recording modes correspond to different bit rates of a program signal outputted from the record signal processor 101, respectively. A higher bit rate of a program signal outputted from the record signal processor 1 causes a better quality of pictures represented by the program signal. A higher bit rate of a program signal causes a shorter play time of a program recorded on the recording medium 104. On the other hand, a lower bit rate of a program signal outputted from the record signal processor 101 causes a lower quality of pictures represented by the program signal. A lower bit rate of a program signal causes a longer play time of a program recorded on the recording medium 104. The playback modes are inverse with respect to the recording modes, respectively.

Each recording mode of operation of the apparatus is started when a corresponding record command signal is inputted into the system controller 109 via the key input unit 112. During each recording mode of operation of the apparatus, the record signal processor 101 converts an input program signal into a compressed program signal of the MPEG format. The record signal processor 101 outputs the MPEG program signal to the record controller 102. On the other hand, the system controller 109 receives the present-date information and the present-time information from the system clock 110. The system controller 109 transfers the present-date information and the present-time information to the record controller 102. The record controller 102 generates a frame information related to the MPEG program signal. The record controller 102 combines the present-date information, the present-time information, and the frame information into auxiliary information. The record controller 102 adds the auxiliary information to the MPEG program signal. The added auxiliary information is equivalent to information of the broadcasting time or the on-air time (the on-air time stamp) of the program signal. The record controller 102 has an internal buffer. The record controller 102 stores the auxiliary-information-added program signal into the internal buffer.

During each recording mode of operation of the apparatus, the record controller 102 is controlled by the system controller 109 so that the auxiliary-information-added program signal is read out from the buffer in the record controller 102 and is outputted to the media manager 103. The media manager 103 is controlled by the system controller 109, thereby converting the program signal from the record controller 102 into a program signal of the prescribed format suited for record on the recording medium 104. The media manager 103 records the prescribed-format program signal on the recording medium 104 while being controlled by the system controller 109. The program signal recorded on the recording medium 104 contains the auxiliary information. In the case where the recording medium 104 includes a hard disk, the media manager 103 converts the program signal from the record controller 102 into data of a prescribed file format suited for record on the hard disk. Under the control by the system controller 109, the media manager 103 generates program-related information which represents the relation between the added auxiliary information and the addresses on the recording medium 104 at which the recorded program signal is located. The media manager 103 records the program-related information on the recording medium 104 in addition to the auxiliary-information-added program signal.

The media manager 103 may record the auxiliary information and the program-related information on a recording medium different from the recording medium 104.

During each recording mode of operation of the apparatus, the system controller 109 monitors, via the media manager 103, the usable capacity (the size of an unused or unoccupied area) in the recording medium 104. The system controller 109 operates to continue the recording of the program signal on the recording medium 104 until the usable capacity in the recording medium 104 becomes null. In the case where the recording of a designated program is reserved, a limit recording capacity can be set to a value smaller than the usable capacity in the recording medium 104. In this case, the system controller 109 inhibits the program signal from being recorded on the recording medium 104 to the extent beyond the limit recording capacity.

In general, the system controller 109 is informed of a designated playback start point (a desired playback start point) via the key input unit 112 when the apparatus is required to operate in one of the playback modes. The system controller 109 notifies the media manager 103 of the designated playback start point. Each playback mode of operation of the apparatus is started when a corresponding playback command signal is inputted into the system controller 109 via the key input unit 112. Specifically, in response to the playback command signal, the system controller 109 controls the media manager 103 to read out the program-related information from the recording medium 104. The media manager 103 refers to the program-related information, and thereby determines a start address on the recording medium 104 which corresponds to the designated playback start point. The media manager 103 accesses the point on the recording medium 104 which is designated by the start address. The media manager 103 reproduces a designated program signal from the recording medium 104 at the start address and subsequent addresses while being controlled by the system controller 109. Under the control by the system controller 109, the media manager 103 converts the reproduced program signal into a program signal of an original format equal to the format of a program signal outputted from the record controller 102. The media manager 103 outputs the resultant program signal to the reproduction controller 105. The reproduction controller 105 has an internal buffer. The reproduction controller 105 stores the program signal from the media manager 103 into the internal buffer. Under the control by the system controller 109, the reproduction controller 105 reads out the program signal from the internal buffer. The reproduction controller 105 extracts the auxiliary information from the read-out program signal.

During each playback mode of operation of the apparatus, the reproduction controller 105 outputs the read-out program signal to the reproduced signal processor 106. In addition, the reproduction controller 105 outputs the extracted auxiliary information to the system controller 109. The reproduced signal processor 106 subjects the program signal from the reproduction controller 105 to the expansion process, for example, the MPEG-based expansion process, to get the expansion-resultant program signal. The reproduced signal processor 106 outputs the expansion-resultant program signal to the OSD processor 107. The expansion-resultant program signal has a set of a video signal and an audio signal. The reproduction signal processor 106 generates a sync signal related to the video signal. The reproduction signal processor 106 outputs the sync signal to the display controller 108. The system controller 109 transfers the auxiliary information from the reproduction controller 105 to the display controller 108. The display controller 108 controls the OSD processor 107 in response to the sync signal from the reproduced signal processor 106 and the auxiliary information from the system controller 109 so that the OSD processor 107 adds suitable on-screen information (OSI) to the program signal outputted from the reproduced signal processor 106. The contents of the on-screen information originate from the auxiliary information. The OSD processor 107 outputs the OSI-added program signal to, for example, the display and audio unit 115 of the television receiver. A video signal in the OSI-added program signal can be indicated on a display of the television receiver while an audio signal therein can be converted into corresponding sounds by loudspeakers of the television receiver. The program signal outputted from the OSC processor 107 may be fed to an external VTR (video tape recorder). In this case, the program signal can be dubbed onto a magnetic tape in the external VTR.

Figure 8:
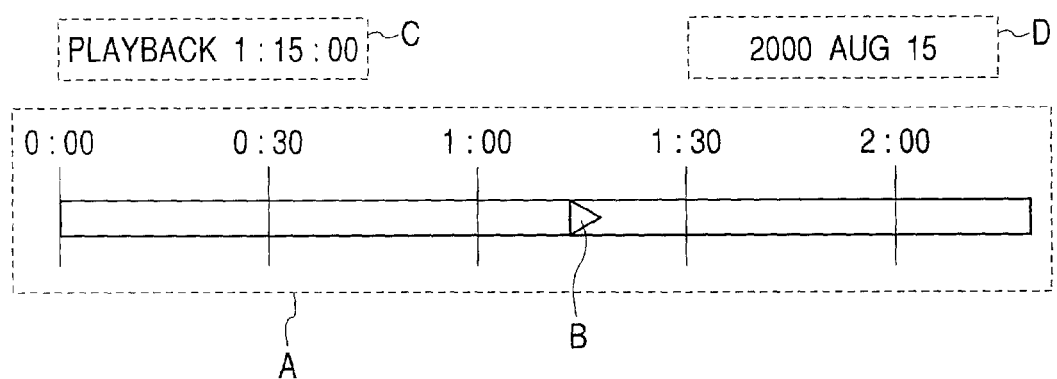
FIG. 8 is a diagram of an example of a picture represented by an OSI-added program signal which occurs during a normal playback mode of operation of the apparatus in FIG. 7.

FIG. 8 shows an example of a picture (a 1-frame picture) represented by the OSI-added program signal which occurs during each playback mode of operation of the apparatus. With reference to FIG. 8, the on-screen information (OSI) corresponds picture portions "A", "B", "C", and "D". Specifically, a first segment of the on-screen information (OSI) corresponds to a bar "A" denoting the total play time of a designated program (a played-back program). A second segment of the on-screen information corresponds to a playback position mark "B" located in the bar "A" which denotes the lapse of playback time relative to the total playback time of the designated program. A third segment of the on-screen information corresponds to numerals and characters "C" located in a left upper area of the picture which denote the lapse of playback time from the head of the designated program. A fourth segment of the on-screen information corresponds to numerals and characters "D" located in a right upper area of the picture which denote the date of the recording of the designated program.

In the apparatus of FIG. 7, the recording of a designated program can be reserved by actuating the key input unit 112. In this case, the apparatus of FIG. 7 operates as follows. When the key input unit 112 is actuated to reserve the recording of a designated program, the system controller 109 generates information of the program record reservation in accordance with the actuation of the key input unit 112. The system controller 109 stores the information of the program record reservation in the record reservation manager 111. The information of the program record reservation represents the day of the broadcasting of the designated program (the reserved program), the start time and end time of the broadcasting of the designated program, the channel of the broadcasting of the designated program, a desired apparatus recording mode, and an assigned program record reservation number. Each time a program record reservation is made, the system controller 109 assigns a program record reservation number thereto. The system controller 109 adds a signal representative of the assigned program record reservation number to information of the program record reservation.

The system controller 109 calculates the time interval between the start time and the end time of the broadcasting of the designated program (the reserved program). The system controller 109 estimates the recording capacity used by the recording of the designated program from the calculated time interval. The system controller 109 monitors, via the media manager 103, the usable capacity (the size of an unused or unoccupied area) in the recording medium 104. The system controller 109 subtracts the estimated recording capacity used by the recording of the designated program from the usable capacity in the recording medium 104. The system controller 109 sets the subtraction result as a limit recording capacity in the recording medium 104. In this way, when the recording of a designated program is reserved, a limit recording capacity is determined which is smaller than the usable capacity in the recording medium 104. The system controller 109 inhibits signal recording from being implemented to an extent beyond the limit recording capacity before the start of the recording of the designated program (the reserved program). In other words, the system controller 109 allows only signal recording to an extent within the limit recording capacity before the start of the recording of the reserved program. The subtraction to set the limit recording capacity is canceled and hence the limit recording capacity is reset to the usable capacity in the recording medium 104 immediately before the start of the recording of the reserved program. Therefore, the estimated recording capacity used by the recording of the reserved program is kept in the recording medium 104 at the start of the recording of the reserved program. Thus, it is possible to surely record the reserved program.

It should be noted that the usable capacity in the recording medium 104 is usually regarded as a limit recording capacity in the absence of a program record reservation.

The system controller 109 receives the present-date information and the present-time information from the system clock 110. The system controller 109 compares the present-date information and the present-time information with the corresponding segments of the information of the program record reservation in the record reservation manager 111 to decide whether or not the present date and the present time are equal to the date and start time of the broadcasting of the reserved program. When the present date and the present time are equal to the date and start time of the broadcasting of the reserved program, the system controller 109 changes the operation of the apparatus to a recording mode equal to the desired apparatus recording mode represented by the information of the program record reservation. As a result, the recording of the reserved program is automatically started. Also, the system controller 109 compares the present-date information and the present-time information with the corresponding segments of the information of the program record reservation in the record reservation manager 111 to decide whether or not the present date and the present time are equal to the date and end time of the broadcasting of the reserved program. When the present date and the present time are equal to the date and end time of the broadcasting of the reserved program, the system controller 109 changes the operation of the apparatus from the recording mode to another mode (for example, the stand-by mode). As a result, the recording mode of operation of the apparatus is automatically suspended when the recording of the reserved program is completed. The system controller 109 informs the media manager 103 of the assigned program record reservation number. The media manager 103 generates information representing the relation between the reservation-based recorded program and the assigned program record reservation number. The media manager 103 records the relation-representing information on the recording medium 104.

The recording of first and second designated programs can be reserved similarly. The system controller 109 estimates the first recording capacity used by the recording of the first designated program (the first reserved program). The system controller 109 estimates the second recording capacity used by the recording of the second designated program (the second reserved program). The system controller 109 adds the estimated first recording capacity and the estimated second recording capacity. The system controller 109 subtracts the addition-result estimated recording capacity from the usable capacity in the recording medium 104. The system controller 109 sets the subtraction result as a limit recording capacity in the recording medium 104. The limit recording capacity is updated immediately before the start of the recording of the first reserved program. Specifically, the system controller 109 subtracts only the estimated second recording capacity from the usable capacity in the recording medium 104. The system controller 109 sets the subtraction result as a new limit recording capacity in the recording medium 104. The subtraction to set the new limit recording capacity is canceled and hence the limit recording capacity is reset to the usable capacity in the recording medium 104 immediately before the start of the recording of the second reserved program. Therefore, it is possible to surely record the first and second reserved programs.

The recording of a designated program can be reserved on an every-week basis. The every-week program record reservation is designed to record a program broadcasted in a same time range on a same day of every week. The every-week program record reservation is made by actuating the key input unit 112 to designate the start time and end time of the broadcasting of a desired program (a reserved program), a day of the week, the channel of the broadcasting of the desired program, and a desired apparatus recording mode.

When the key input unit 112 is actuated to make an every-week program record reservation, the system controller 109 generates information of the every-week program record reservation in accordance with the actuation of the key input unit 112. The system controller 109 stores the information of the every-week program record reservation in the record reservation manager 111. At this time, the system controller 109 assigns a program record reservation number to the every-week program record reservation. The assigned program record reservation number is represented by a segment of the information of the every-week program record reservation in the record reservation manager 111. The system controller 109 estimates the recording capacity used by the recording of the designated program (the reserved program). The system controller 109 subtracts the estimated recording capacity used by the recording of the reserved program from the usable capacity in the recording medium 104. The system controller 109 sets the subtraction result as a limit recording capacity in the recording medium 104. The subtraction to set the limit recording capacity is canceled and hence the limit recording capacity is reset to the usable capacity in the recording medium 104 immediately before the start of the recording of the reserved program. Therefore, it is possible to surely record the reserved program for the first week.

Regarding the every-week program record reservation, the system controller 109 reads out the assigned program record reservation number from the information of the every-week program record reservation in the record reservation manager 111 before the start of the recording of the reserved program for the second or later week. In addition, the system controller 109 accesses the recording medium 104 via the media manager 103 to decide whether or not a recorded program related to the assigned program record reservation number is on the recording medium 104. In the case where a recorded program related to the assigned program record reservation number is not on the recording medium 104, the system controller 109 estimates the recording capacity used by the recording of the designated program (the reserved program). The system controller 109 subtracts the estimated recording capacity used by the recording of the reserved program from the usable capacity in the recording medium 104. The system controller 109 sets the subtraction result as a limit recording capacity in the recording medium 104. The subtraction to set the limit recording capacity is canceled and hence the limit recording capacity is reset to the usable capacity in the recording medium 104 immediately before the start of the recording of the reserved program. Then, the recording of the reserved program for the second or later week is started. On the other hand, in the case where a recorded program related to the assigned program record reservation number is on the recording medium 104, the area of the recording medium 104 which stores the recorded program is released and is added to the usable capacity in the recording medium 104 immediately before the start of the recording of the reserved program for the second or later week. Thus, the usable capacity in the recording medium 104 is increased while the limit recording capacity is updated. Then, the recording of the reserved program is started for the second or later week. Therefore, it is possible to surely record the reserved program for the second or later week.

The recording of a designated program can be reserved on an every-day basis. The every-day program record reservation is designed to record a program broadcasted in a same time range on each of two or more days of every week. The every-day program record reservation is made by actuating the key input unit 112 to designate the start time and end time of the broadcasting of a desired program (a reserved program), days of the week, the channel of the broadcasting of the desired program, and a desired apparatus recording mode.

When the key input unit 112 is actuated to make an every-day program record reservation, the system controller 109 generates information of the every-day program record reservation in accordance with the actuation of the key input unit 112. The system controller 109 stores the information of the every-day program record reservation in the record reservation manager 111. At this time, the system controller 109 assigns program record reservation numbers to the respective designated days of the week in the every-day program record reservation. The assigned program record reservation numbers are represented by segments of the information of the every-day program record reservation in the record reservation manager 111. The system controller 109 estimates the recording capacity used by the recording of the designated program (the reserved program) for the designated days of the week. The system controller 109 subtracts the estimated recording capacity used by the recording of the reserved program for the designated days of the week from the usable capacity in the recording medium 104. The system controller 109 sets the subtraction result as a limit recording capacity in the recording medium 104. The limit recording capacity is updated immediately before the start of the recording of the reserved program for first one of the designated days of the first week. Specifically, the system controller 109 estimates the recording capacity used by the recording of the designated program (the reserved program) for second and later ones of the designated days of the week. The system controller 109 subtracts the estimated recording capacity from the usable capacity in the recording medium 104. The system controller 109 sets the subtraction result as a new limit recording capacity in the recording medium 104. Then, the recording of the reserved program for first one of the designated days of the first week is executed.

Before the start of the recording of the reserved program for second one of the designated days of the first week, the system controller 109 decides whether or not a recorded program related to the program record reservation number assigned to second one of the designated days of the week is on the recording medium 104. During the first week, a recorded program related to the assigned program record reservation number is not on the recording medium 104. In this case, the limit recording capacity is updated immediately before the start of the recording of the reserved program for second one of the designated days of the first week. Specifically, the system controller 109 estimates the recording capacity used by the recording of the designated program (the reserved program) for third and later ones of the designated days of the week. The system controller 109 subtracts the estimated recording capacity from the usable capacity in the recording medium 104. The system controller 109 sets the subtraction result as a new limit recording capacity in the recording medium 104. Then, the recording of the reserved program for second one of the designated days of the first week is executed.

Before the start of the recording of the reserved program for third one of the designated days of the first week, the system controller 109 decides whether or not a recorded program related to the program record reservation number assigned to third one of the designated days of the week is on the recording medium 104. During the first week, a recorded program related to the assigned program record reservation number is not on the recording medium 104. In this case, the limit recording capacity is updated immediately before the start of the recording of the reserved program for third one of the designated days of the first week. Specifically, the system controller 109 estimates the recording capacity used by the recording of the designated program (the reserved program) for fourth and later ones of the designated days of the week. The system controller 109 subtracts the estimated recording capacity from the usable capacity in the recording medium 104. The system controller 109 sets the subtraction result as a new limit recording capacity in the recording medium 104. Then, the recording of the reserved program for third one of the designated days of the first week is executed.

Before the start of the recording of the reserved program for first one of the designated days of the second or later week, the system controller 109 decides whether or not a recorded program related to the program record reservation number assigned to first one of the designated days of the week is on the recording medium 104. During the second or later week, a recorded program related to the assigned program record reservation number is on the recording medium 104. In this case, the area of the recording medium 104 which stores the recorded program is released and is added to the usable capacity in the recording medium 104 immediately before the start of the recording of the reserved program for first one of the designated days of the second or later week. Thus, the usable capacity in the recording medium 104 is increased while the limit recording capacity is updated. Then, the recording of the reserved program for first one of the designated days of the second or later week is executed.

Before the start of the recording of the reserved program for second or later one of the designated days of the second or later week, the system controller 109 decides whether or not a recorded program related to the program record reservation number assigned to second or later one of the designated days of the week is on the recording medium 104. During the second or later week, a recorded program related to the assigned program record reservation number is on the recording medium 104. In this case, the area of the recording medium 104 which stores the recorded program is released and is added to the usable capacity in the recording medium 104 immediately before the start of the recording of the reserved program for second or later one of the designated days of the second or later week. Thus, the usable capacity in the recording medium 104 is increased while the limit recording capacity is updated. Then, the recording of the reserved program for second or later one of the designated days of the second or later week is executed.

As previously mentioned, regarding the recording of the reserved program for every one of the designated days of the second or later week, the area of the recording medium 104 which stores the corresponding old recorded program is released and is added to the usable capacity in the recording medium 104. Thus, during every one of the designated days of the second or later week, the reserved program is recorded over the corresponding old recorded program in the recording medium 104. Accordingly, from a substantial standpoint, the recording of the reserved program does not require a new area in the recording medium 104. Thus, it is possible to surely record the reserved program. In addition, it is possible to prevent the recording medium 104 from being fully filled with programs recorded on the basis of an every-day program record reservation. As understood from the previous description, the recorded program based on the every-day program record reservation is updated week by week. It should be noted that the recorded program based on the every-day program record reservation may be updated month by month. In this case, regarding the recording of the reserved program for every one of the designated days of the week in the second or later month, the area of the recording medium 104 which stores the corresponding old recorded program is released and is added to the usable capacity in the recording medium 104.

What is claimed is:

1. A program-signal recording and reproducing apparatus comprising:
    first means for accepting a reservation about recording of a designated program;
    second means for calculating a recording capacity necessary for the recording of the designated program;
    third means for detecting an unoccupied recording capacity in a recording medium;
    fourth means for subtracting the recording capacity calculated by the second means from the unoccupied recording capacity detected by the third means;
    fifth means for setting a result of the subtracting by the fourth means as a limit recording capacity;
    sixth means for recording the designated program on the recording medium;
    seventh means for inhibiting signal recording on the recording medium to an extent beyond the limit recording capacity set by the fifth means before the sixth means starts recording the designated program on the recording medium; and
    eighth means for canceling the subtracting by the fourth means to reset the limit recording capacity immediately before the sixth means starts recording the designated program on the recording medium.

2. A program-signal recording and reproducing apparatus comprising:
    first means for accepting a reservation about recording of a designated program broadcasted in a same time range of a designated day of every week;
    second means for detecting whether or not the designated program broadcasted on the designated day of a previous week is present on a recording medium as a recorded program;
    third means for, in cases where the second means detects that the designated program broadcasted on the designated day of a previous week is not present on the recording medium as a recorded program, (1) calculating a recording capacity necessary for the recording of the designated program, (2) detecting an unoccupied recording capacity in the recording medium, (3) subtracting the calculated recording capacity from the detected unoccupied recording capacity, and (4) setting a result of the subtracting as a limit recording capacity;

fourth means for recording the designated program in a current week on the recording medium in cases where the second means detects that the designated program broadcasted on the designated day of a previous week is not present on the recording medium as a recorded program;

fifth means for inhibiting signal recording on the recording medium to an extent beyond the limit recording capacity set by the third means before the fourth means starts recording the designated program on the recording medium; and sixth means for, in cases where the second means detects that the designated program broadcasted on the designated day of a previous week is present on the recording medium as a recorded program, (1) releasing an area of the recording medium which stores the recorded program and adding the released area to the unoccupied recording capacity in the recording medium, and then (2) recording the designated program in a current week on the recording medium;

wherein the sixth means implements releasing the area and adding the released area at a stage immediately preceding the execution of the recording of the designated program in the current week.

* * * * *